United States Patent
Xu et al.

(10) Patent No.: US 9,909,738 B2
(45) Date of Patent: Mar. 6, 2018

(54) HIGHLY STABLE QDS-COMPOSITES FOR SOLID STATE LIGHTING AND THE METHOD OF MAKING THEM THROUGH INITIATOR-FREE POLYMERIZATION

(71) Applicants: Koninklijke Philips N.V., Eindhoven (NL); SAMSUNG ELECTRONICS CO., LTD., Suwon-si (KR)

(72) Inventors: Shu Xu, Shanghai (CN); Marius Gabriel Ivan, Ottawa (CA); Craig Allen Breen, Lexington, MA (US); Rifat Ata Mustafa Hikmet, Eindhoven (NL)

(73) Assignees: Koninklijke Philips N.V., Eindhoven (NL); Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 15/339,528

(22) Filed: Oct. 31, 2016

(65) Prior Publication Data
US 2017/0059128 A1    Mar. 2, 2017

Related U.S. Application Data

(63) Continuation of application No. 14/419,579, filed as application No. PCT/IB2013/055904 on Jul. 18, 2013, now Pat. No. 9,506,627.

(Continued)

(51) Int. Cl.
*F21V 7/10*    (2006.01)
*F21V 7/22*    (2006.01)
(Continued)

(52) U.S. Cl.
CPC ............... *F21V 9/16* (2013.01); *B82Y 20/00* (2013.01); *C01G 23/047* (2013.01); *C09K 11/02* (2013.01);
(Continued)

(58) Field of Classification Search
CPC ..... F21V 9/16; F21V 3/00; F21K 9/62; F21K 9/64; C01G 23/047; C09K 11/025;
(Continued)

(56) References Cited

U.S. PATENT DOCUMENTS 7,160,613 B2    1/2007    Bawendi et al.
7,564,067 B2 *  7/2009    Cok ....................... B82Y 20/00
                                                        257/81

(Continued)

FOREIGN PATENT DOCUMENTS

TW    201141985 A    12/2011
TW    201214795 A    4/2012
(Continued)

OTHER PUBLICATIONS

Second Office Action dated Nov. 9, 2016, China Application No. 201380041981.8, 18 pages.
(Continued)

*Primary Examiner* — Tracie Y Green

(57) ABSTRACT

The invention provides a lighting device comprising (i) a light source configured to generate light source light, and (ii) a light converter configured to convert at least part of the light source light into visible converter light, wherein the light converter comprises a polymeric host material with light converter nanoparticles embedded in the polymeric host material, wherein the polymeric host material is based on radical polymerizable monomers, and wherein the polymeric host material contains equal to or less then 5 ppm radical initiator based material relative to the total weight of the polymeric host material.

20 Claims, 3 Drawing Sheets

Related U.S. Application Data

(60) Provisional application No. 61/679,956, filed on Aug. 6, 2012.

(51) Int. Cl.

| | | |
|---|---|---|
| *F21V 9/16* | (2006.01) | |
| *B82Y 20/00* | (2011.01) | |
| *C09K 11/02* | (2006.01) | |
| *C09K 11/56* | (2006.01) | |
| *C09K 11/88* | (2006.01) | |
| *G02F 1/1335* | (2006.01) | |
| *F21K 9/62* | (2016.01) | |
| *F21K 9/64* | (2016.01) | |
| *C01G 23/047* | (2006.01) | |
| *F21V 3/00* | (2015.01) | |
| *G02F 1/017* | (2006.01) | |
| *B82Y 35/00* | (2011.01) | |
| *F21Y 115/30* | (2016.01) | |
| *F21Y 115/10* | (2016.01) | |

(52) U.S. Cl.
CPC .......... *C09K 11/025* (2013.01); *C09K 11/565* (2013.01); *C09K 11/883* (2013.01); *F21K 9/62* (2016.08); *F21K 9/64* (2016.08); *F21V 3/00* (2013.01); *G02F 1/133609* (2013.01); *B82Y 35/00* (2013.01); *C01P 2006/60* (2013.01); *F21Y 2115/10* (2016.08); *F21Y 2115/30* (2016.08); *G02F 2001/01791* (2013.01); *G02F 2001/133614* (2013.01); *Y10S 977/774* (2013.01); *Y10S 977/779* (2013.01); *Y10S 977/89* (2013.01); *Y10S 977/95* (2013.01)

(58) Field of Classification Search
CPC ..... C09K 11/565; C09K 11/883; C09K 11/02; G02F 1/133609; B82Y 20/00
See application file for complete search history.

(56) References Cited

U.S. PATENT DOCUMENTS

| 8,849,087 | B2 | 9/2014 | Breen et al. | |
|---|---|---|---|---|
| 9,506,627 | B2* | 11/2016 | Xu | B82Y 20/00 |
| 2007/0292631 | A1 | 12/2007 | Shinozaki et al. | |
| 2008/0012031 | A1* | 1/2008 | Jang | C09K 11/02 |
| | | | | 257/89 |
| 2010/0123155 | A1 | 5/2010 | Pickett et al. | |
| 2011/0068321 | A1 | 3/2011 | Pickett et al. | |
| 2011/0068322 | A1 | 3/2011 | Pickett et al. | |
| 2011/0245533 | A1 | 10/2011 | Breen et al. | |
| 2011/0309325 | A1 | 12/2011 | Park et al. | |
| 2012/0113672 | A1* | 5/2012 | Dubrow | B82Y 20/00 |
| | | | | 362/602 |
| 2012/0190795 | A1 | 7/2012 | Goto et al. | |
| 2012/0286238 | A1* | 11/2012 | Linton | C09K 11/025 |
| | | | | 257/13 |
| 2013/0104986 | A1* | 5/2013 | Jung | B82Y 20/00 |
| | | | | 136/260 |
| 2014/0027673 | A1 | 1/2014 | Nick et al. | |
| 2014/0027711 | A1 | 1/2014 | Breen et al. | |
| 2014/0369024 | A1* | 12/2014 | Xu | C08F 2/44 |
| | | | | 362/84 |
| 2014/0374696 | A1* | 12/2014 | Liu | H01L 51/502 |
| | | | | 257/13 |
| 2015/0291876 | A1* | 10/2015 | Koole | C09K 11/025 |
| | | | | 362/84 |
| 2015/0300578 | A1* | 10/2015 | Ivan | C09K 11/06 |
| | | | | 362/84 |

FOREIGN PATENT DOCUMENTS

| WO | WO-03093328 A1 | 11/2003 |
|---|---|---|
| WO | 2009035657 A1 | 3/2009 |
| WO | 2010014198 A1 | 2/2010 |
| WO | 2010077226 A1 | 7/2010 |
| WO | WO-2011031871 A1 | 3/2011 |
| WO | 2012021643 A2 | 2/2012 |
| WO | WO-2012067766 A2 | 5/2012 |
| WO | 2012085780 A1 | 10/2016 |

OTHER PUBLICATIONS

Taiwan Office Action dated Sep. 9, 2016, TW Application No. 102128163, 14 pages.
"Charge Separation and Transport in Conjugated-Polymer/Semiconductor-Nanocrystal Composites Studied by Photoluminescence Quenching and Photoconductivity" N.C. Greenham et al, Physical Review B, vol. 54, No. 24, Dec. 15, 1996.
"Chem. 421: Introduction to Polymer Chemistry" University of Rochester Feb. 21, 2012.
"Development of New Polymer Systems and Quantum Dots . . . ", Zhao et al, Hewlett Packard Development Company LLC, May 21, 2011, 13 Pages.
"Dynamics of the Dissociation of a Disulfide Biradical on a CdSe Nanoparticle Surface" Billone, et al., J. Am. Chem. Soc. 2007 129, p. 14150-14151.
Fabrication of a Quantum Dot-Polymer Matrix by Layer-By-Layer Conjugation, Ishii et al, Journal of Photochemistry and Photobiology, vol. 183, Issue 3, Oct. 25, 2006, pp. 285-291.
"Non-Linear Effects in the Quenching of Fluorescent Semiconductor Nanoparticles by Paramagnetic Species" Scaiano et al., Phys. Stat. Sol. (A) 203, No. 6, p. 1337-1343 (2006).
"Overcoming Oxygen Inhibition in UV-Curing of Acrylate Coatings by Carbon Dioxide Inerting", Studer et al., Progress in Organic Coatings, vol. 48, Issue 1, Nov. 2003, pp. 101-111.
"The Effects of Chemisorption on the Luminescence of CdSe Quantum Dots" Bullen etal , Langmuir 2006, 22 (7), pp. 3007-3013.
EPO as ISA, PCT/IB2013/055904 filed Jul. 18, 2013, "International Search Report and Written Opinion" dated Feb. 5, 2014, 9 pps.
First Office Action dated Feb. 19, 2016, China Application No. 201380041981.8, 21 pages.
JP Office Action dated Jun. 20, 2017, Japan Application No. 2015-525964, 7 pages.

* cited by examiner

US 9,909,738 B2

HIGHLY STABLE QDS-COMPOSITES FOR SOLID STATE LIGHTING AND THE METHOD OF MAKING THEM THROUGH INITIATOR-FREE POLYMERIZATION

CROSS-REFERENCE TO RELATED APPLICATIONS

The present application is a continuation of U.S. patent application Ser. No. 14/419,579 filed on Feb. 4, 2015, titled "HIGHLY STABLE QDS-COMPOSITES FOR SOLID STATE LIGHTING AND THE METHOD OF MAKING THEM THROUGH INITIATOR-FREE POLYMERIZATION", which is a §371 application of International Application No. PCT/IB2013/055904 filed on Jul. 18, 2013, which claims priority to U.S. Provisional Patent Application No. 61/679,956 filed on Aug. 6, 2012. U.S. patent application Ser. No. 14/419,579, International Application No. PCT/IB2013/055904, and U.S. Provisional Patent Application No. 61/679,956 are incorporated herein.

FIELD OF THE INVENTION

The invention relates to a lighting device comprising (i) a light source, configured to generate light source light, and (ii) a light converter, configured to convert at least part of the light source light into visible converter light. The invention further relates to a liquid crystal display device comprising a back lighting unit with such lighting devices. Further, the invention relates to the light converter per se, as well as to a method for the production of such light converter.

BACKGROUND OF THE INVENTION

Quantum dot (QD) based lighting is known in the art. WO2012021643, for instance, describes systems and methods that relate to quantum dot structures for lighting applications. In particular, quantum dots and quantum dot containing inks (comprising mixtures of different wavelength quantum dots) are synthesized for desired optical properties and integrated with an LED source to create a trichromatic white light source. The LED source may be integrated with the quantum dots in a variety of ways, including through the use of a small capillary filled with quantum dot containing ink or a quantum dot containing film placed appropriately within the optical system. These systems may result in improved displays characterized by higher color gamuts, lower power consumption, and reduced cost. For instance, this document describes a method of generating trichromatic white light comprising contacting light from a light source capable of emitting blue light with an optical material comprising a host material and first quantum dots capable of emitting green light and second quantum dots capable of emitting red light, wherein the weight percent ratio of the first quantum dots to the second quantum dots in the optical material is in a range from about 9:1 to about 2:1, and generating trichromatic white light from a combination of the light from the light source, the light from the first quantum dots and the light from the second quantum dots.

SUMMARY OF THE INVENTION

Nanoparticles such as quantum dots (QDs) can possess properties which make them advanced luminescent materials to be used in solid state lighting. Here below, nanoparticles, such as quantum dots, that have the ability to give (visible) luminescence are also indicated as "light converter nanoparticles". They can e.g. be used in converting blue light to other colors, for obtaining high quality white light with high efficacy. Nanoparticles such as QDs have the advantage of a narrow emission band and color tunablility by varying the size of the particles. For their applications in solid state lighting it may be necessary to embed the light converter nanoparticles in transmissive solid matrices such as polymers. One of the ways to obtain such a polymer matrix containing light converter nanoparticles is to first make a mixture of free-radical polymerisable monomers such as one or more of acrylates and thiolene system with light converter nanoparticles. In order to initiate the polymerization of the monomer, an initiator which can be activated thermally or photo chemically can be added to the mixture. Radical initiators generally possess weak bonds that have small bond dissociation energies, can produce radical species under mild conditions such as heating and UV irradiation, and initiate free radical polymerization of acrylates, vinyls, and thiolene systems.

An example of a thermal initiator is benzoyl peroxide and azo-isobutyro-nitril (AIBN) (see further also below). In addition to or alternative to such azo initiator, a peroxide initiator can also be used. Further, in addition to or alternative to such initiator, also photo initiators such as $\alpha,\alpha$-dimethoxy-$\alpha$-phenylacetophenone can be used.

While such radicals can initiate polymerization they can also negatively influence the light converter nanoparticles. They can quench the emission of light converter nanoparticles by decreasing both quantum efficiency and stability of the light converter nanoparticles.

Hence, it is an aspect of the invention to provide a lighting device and/or light converter (for such lighting device), which preferably further at least partly obviate one or more of above-described drawbacks.

Here we suggest using a system which can be polymerized in the absence of or at extremely low concentration of initiator.

However, it appears that at such low initiator concentrations polymerization is easily terminated by the presence oxygen. For this purpose, we further especially suggest removing substantially all the oxygen which may lead to inhibition of polymerization of the monomeric mixture.

In such a system, free radicals seem nevertheless to appear to be to be formed by e.g. radiation (optionally while heating), even with radiation having a wavelength in the range of 250-470 nm, such as 300-460 nm, such as at least 300 nm, like 365 nm. For example, light may generate a chain reaction which may lead to the polymerization of the system (in the substantial absence of a radical initiator).

We surprisingly found that the systems produced without or an extremely low amount of the initiator showed three orders of magnitude higher stability than systems produced with the expected amount of radical initiator.

We therefore suggest herein the system (further also indicated as "light converter") of initiator free polymerized systems containing light converter nanoparticles with high stability as light converting materials for e.g. solid state lighting and the method for producing such light converter.

Hence, in a first aspect, the invention provides a lighting device ("device") comprising:
  a light source configured to generate light source light,
  a light converter configured to convert at least part of the light source light into visible converter light, wherein the light converter comprises a polymeric host material with light converter nanoparticles embedded in the polymeric host material, wherein the polymeric host material is based on radical (photo initiator) polymerizable monomers, and wherein the polymeric host material contains equal to or less then 5 ppm radical initiator based material relative to the total weight of the polymeric host material. Especially, the light converter is enclosed by an encapsulation, wherein the encapsulation is configured to reduce exposure of the light converter to $O_2$. The combination of light converter and encapsulate is herein also indicated as light converter unit.

As indicated above such light converter has much better optical properties than expected and has optical properties, especially in respect of stability, that is much larger than in the presence of substantial amounts of radical initiator. Surprisingly, even in the absence of the radical initiator, the radical polymerizable monomers appear to form a polymer upon irradiation with light and/or due to thermal heating, especially due to irradiation with light, especially UV light.

Surprisingly, polymerization (substantially) without photo initiator at long wavelength irradiation such as 365 nm takes place. The polymerization reaction may start during UV exposure step, and then continue during a heating stage, or during exposure to the emission light from the converter nanoparticles, such as blue light. Exposure to blue may cause the temperature in the film to rise, due to <100% quantum yield, meaning that the energy of some of the photons absorbed by the quantum dots is released as heat. This may (further) lead to polymerization. The invention thus allows making systems which have substantially no photo initiator, which leads to more stable systems with more stable optical properties. The luminescence intensity as function of time is much more stable for systems according to the invention, than systems with substantially higher amount of photo initiator.

Hence, in a further aspect, the invention also provides such light converter per se.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting As indicated above, the lighting unit may be used as backlighting unit in an LCD display device. Hence, the invention provides also a LCD display device comprising the lighting unit as defined herein, configured as backlighting unit. The invention also provides in a further aspect a liquid crystal display device comprising a back lighting unit, wherein the back lighting unit comprises one or more lighting devices as defined herein.

Preferably, the light source is a light source that during operation emits (light source light) at least light at a wavelength selected from the range of 200-490 nm, especially a light source that during operation emits at least light at wavelength selected from the range of 400-490 nm, even more especially in the range of 440-490 nm. This light may partially be used by the light converter nanoparticles (see further also below). Hence, in a specific embodiment, the light source is configured to generate blue light.

In a specific embodiment, the light source comprises a solid state LED light source (such as a LED or laser diode).

The term "light source" may also relate to a plurality of light sources, such as 2-20 (solid state) LED light sources. Hence, the term LED may also refer to a plurality of LEDs.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10000 K). Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relative high blue component in the light source light.

The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 540-570 nm. The terms "orange light" or "orange emission" especially relate to light having a wavelength in the range of about 570-600. The terms "red light" or "red emission" especially relate to light having a wavelength in the range of about 600-750 nm. The term "pink light" or "pink emission" refers to light having a blue and a red component. The terms "visible", "visible light" or "visible emission" refer to light having a wavelength in the range of about 380-750 nm.

The light converter can be seen as a (solid) entity, in general essentially comprising the polymeric host material and the light converter nanoparticles. The latter are in general essentially embedded in the polymeric host material. Hence, the light converter nanoparticles are enclosed by the polymeric host material. Especially, the light converter nanoparticles are dispersed in the polymeric host material. The polymeric host material is thus especially configured to be a polymer matrix (for the light converter nanoparticles embedded therein). The light converter may be encapsulated (see further below). The light converter (and also the light converter unit) may be a film, a layer, such as a self supporting layer, or a body.

The light converter can be configured as light exit window of the lighting device. Hence, in such embodiment, light from the light source and converter light (see further below) may emanate from the lighting device via and from the light converter (during use of the device). The light converter may also be configured in reflective mode. For instance, a light mixing chamber may comprise one or more wall(s) comprising the light converter (reflective mode) and/or an exit window comprising the light converter (transmissive mode).

The light converter (or more precisely the light converter nanoparticles) is (are) radiationally coupled to the light source (or, as indicated above, a plurality of light sources).

The term "radiationally coupled" especially means that the light source and the light converter are associated with each other so that at least part of the radiation emitted by the light source is received by the light converter (and at least partly converted into luminescence). The term "luminescence" refers to the emission which emits the light converter nanoparticles emit upon excitation by the light source light of the light source. This luminescence is herein also indicated as converter light (which at least comprises visible light, see also below).

The light converter will in general also be configured downstream of the light source. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The device is especially configured to generate device light, which at least partly comprises the converter light, but which may optionally also comprise (remaining) light source light. For instance, the light converter may be configured to only partly convert the light source light. In such instance, the device light may comprise converter light and light source light. However, in another embodiment the light converter may also be configured to convert all the light source light.

Hence, in a specific embodiment, the lighting device is configured to provide lighting device light comprising both light source light and converter light, for instance the former being blue light, and the latter comprising yellow light, or yellow and red light, or green and red light, or green, yellow and red light, etc. In yet another specific embodiment, the lighting device is configured to provide only lighting device light comprising only converter light. This may for instance happen (especially in transmissive mode) when light source light irradiating the light converter only leaves the downstream side of the light converter as converted light (i.e. all light source light penetrating into the light converter is absorbed by the light converter).

The term "light converter" may also relate to a plurality of light converters. These can be arranged downstream of one another, but may also be arranged adjacent to each other (optionally also even in physical contact as directly neighboring light converters). The plurality of light converters may comprise in an embodiment two or more subsets which have different optical properties. For instance, one or more subsets may be configured to generate light converter light with a first spectral light distribution, like green light, and one or more subsets may be configured to generate light converter light with a second spectral light distribution, like red light. More than two or more subsets may be applied. When applying different subsets having different optical properties, e.g. white light may be provided and/or the color of the device light (i.e. the converter light and optional remaining light source light (remaining downstream of the light converter). Especially when a plurality of light sources is applied, of which two or more subsets may be individually controlled, which are radiationally coupled with the two or more light converter subsets with different optical properties, the color of the device light may be tunable. Other options to make white light are also possible (see also below).

As indicated above, the light converter in general essentially comprises the polymeric host material and the light converter nanoparticles.

The phrase "wherein the polymeric host material is based on radical polymerizable monomers", may especially indicate that the polymer host material is obtainable by reaction monomers that are able to form polymers by radical polymerization. A non-limiting number of examples of such polymers are mentioned below, and the person skilled in the art may derive therefrom which monomers (i.e. monomer precursors) may be used (see further also below). Such monomer thus especially includes one or more radical-polamerizable groups (which may be used for polymerization with a photo initiator upon irradiation). Such monomers may in an embodiment include different type of monomers.

As can for instance be derived from WO 03/093328, examples of monomers polymerizable by a free radical polymerization process include, but are not limited to, alpha-olefins; dienes such as butadiene and chloroprene; styrene, alpha-methyl styrene, and the like; heteroatom substituted alpha-olefins, for example, vinyl acetate, vinyl alkyl ethers for example, ethyl vinyl ether, vinyltrimethylsilane, vinyl chloride, tetrafluoroethylene, chlorotrifluoroethylene, N-(3-dimethylaminopropyl methacrylamide, dimethylaminopropyl methacrylamide, acrylamide, methacrylamide, and similar derivatives; acrylic acids and derivatives for example, acrylic acid, methacrylic acid, crotonic acid, acrylonitrile, acrylic esters substituted with methoxy, ethoxy, propoxy, butoxy, and similar derivatives for example, methyl acrylate, propyl acrylate, butyl acrylate, methyl methacrylate, methyl crotonate, glycidyl methacrylate, alkyl crotonates, and related esters; cyclic and polycyclic olefin compounds for example, cyclopentene, cyclohexene, cycloheptene, cyclooctene, and cyclic derivatives up to C20; polycyclic derivates for example, norbornene, and similar derivatives up to C20; cyclic vinyl ethers for example, 2, 3-dihydrofuran, 3,4-dihydropyran, and similar derivatives; allylic alcohol derivatives for example, vinylethylene carbonate, disubstituted olefins such as maleic and fumaric compounds for example, maleic anhydride, diethylfumarate, and the like; and mixtures thereof.

As can be derived from e.g. WO 2011/031871, additional examples of monomers include, but are not limited to, allyl methacrylate, benzyl methyl acrylate, 1,3-butanediol dimethacrylate, 1,4-butanediol dimethacrylate, butyl acrylate, n-butyl methacrylate, ethyl methacrylate, 2-ethyl hexyl acrylate, 1,6-hexanediol dimethacrylate, 4-hydroxybutyl acrylate, hydroxyethyl acrylate, 2-hydroxyethyl methacrylate, 2-hydroxypropyl acrylate, isobutyl methacrylate, lauryl methacrylate, methacrylic acid, methyl acrylate, 2,2,3,3,4,4,5,5-octafluoropentyl acrylate, pentaerythritol triacrylate, 2,2,2-trifluoroethyl 2-methyl acrylate, trimethylolpropane triacrylate, acrylamide n,n,-methylene-bisacryl-amide phenyl acrylate, and divinyl benzene.

Many of these types of monomers are acrylate systems. Hence, the term "acrylate" may refer to any of those above mentioned systems such as acrylate, meth(yl)acrylate, butyl acrylate, lauryl methacrylate, etc. etc. Likewise, vinyl monomer may refer to any monomer comprising a vinyl group.

The phrase "wherein the polymeric host material is based on radical polymerizable monomers" does not exclude the presence of e.g. cross-linkers in the monomeric starting material. For the synthesis of the light converter, see below.

In principle, the polymer obtained may be any polymer, such as a linear polymer, a (hyper)branched polymer, a cross-linked polymer, a star polymer, a dendrimer, a random copolymer, an alternating copolymer, a graft copolymer, a block copolymer, and a terpolymer. The polymeric host material may in an embodiment be or comprise a resin.

Especially those radical polymerizable monomers are applied, which lead to a light transmissive polymer. In the embodiment of the invention, the (light transmissive polymer) is a polymer which shows high light transmission. Preferably a mean absorption of less than 5%/mm more preferentially less than 2%/mm, especially less than 1%/mm (per mm polymer thickness) in the wavelength region 400-700 nm. Hence, in an embodiment the first polymer is a polymer having an absorption of less than 5%/mm, more preferentially less than 2%/mm and most preferentially less than 1%/mm in the wavelength range of 400-700 nm. Note that the transmission and absorption of the polymer is related to the polymer per se, i.e. the polymeric host material, and not to the transmission of the light converter (i.e. including the light converter nanoparticles). Especially, the maximum absorption (of the first polymer) is less than 20%/mm, even more especially less than 10%/mm, over the entire wavelength region 400-700 nm. Transmission (T) and absorption (A) relate as $A=1-To/Ti$, wherein Ti the intensity of the visible light impinging on the item (such as the first polymer or the converter) and To being is the intensity of the light escaping at the other side of the item. The transmission or light permeability can be determined by providing light at a specific wavelength with a first intensity to the material and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989). Herein, transmissive ma relate to transparent and to translucent.

As can e.g. be derived from WO 2011/031871, examples of polymers, for example and without limitation, are polyethylene, polypropylene, polystyrene, polyethylene oxide, polysiloxane, polyphenylene, polythiophene, poly (phenylene-vinylene), polysilane, polyethylene terephthalate and poly (phenylene-ethynylene), polymethylmethacrylate, polylaurylmethacrylate, polycarbonate, epoxy, and other epoxies. Similar as what has been said with respect to monomers, some of these types of polymers are acrylate systems. Hence, the term "polyacrylate" may refer to any of those above mentioned systems such as polyacrylate, polymeth(yl)acrylate, polybutyl acrylate, polylauryl methacrylate, etc. etc. Likewise, vinylpolymer may refer to any polymer based on monomers comprising a vinyl group, such as polyethylene, polyprolylene, etc. etc.

In view of light transmission and/or chemical stability and/or production process considerations, especially the polymeric host material is selected from the group consisting of a poly vinyl polymer (such as a poly ethylene, a poly propylene, etc.), a poly acrylate polymer (such as a poly acrylate, a poly methacrylate, a poly laurylmethacrylate, etc.) and a thiol-ene polymer (such as polythiophene).

In some embodiments, though not exclusively, the device is configured in such a way and the polymeric host material is chosen (designed) in such a way that during operation of the device, the temperature of the light converter is below the glass temperature (Tg) of the polymer of the polymeric host material, especially at least 10° C. below the glass temperature. However, other systems wherein above condition is not fulfilled may also be chosen. For instance, polymeric host material may have a glass temperature of 130° C. and an application temperature of 120° C. To increase the glass temperature, a cross-linker may be included in the starting mixture.

Polymers obtained with low concentration of initiator may have high molecular weight, and therefore have long chains with reduced mobility. This may restrict light converter nanoparticles from migrating in the polymer film and forming aggregates with red-shifted emission, lower quantum yield (QY) and fast decaying photo luminescence (PL). Longer polymer molecules also ensure a higher glass transition temperature of the polymer, conferring it stability over a larger temperature interval.

As indicated above, the polymeric host material is substantially free from radical initiator based material. This is indicated with the phrase "wherein the polymeric host material contains equal to or less then 5 ppm radical initiator based material relative to the total weight of the polymeric host material." Hence, the radical initiator content is defined with respect to the weight of the polymeric host material, and not with respect to the light converter. Hence, the radical initiator content is the weight percentage of the radical initiator based material relative to the total amount of polymer. For instance, starting with 5 mg photo initiator, 1 g light converter nanoparticles and 5 kg radical polymerizable monomers may lead to a light converter comprising about 1 ppm radical initiator based material and about 0.02 wt. % light converter nano particles.

In prior art systems, the radical initiator based material content may for instance be over 2000 ppm, whereas in the present invention, the amount is 5 ppm or lower, such as ≤1 ppm, even more especially ≤0.1 ppm, yet even more especially ≤0.01 ppm, like at maximum 1 ppb. Especially, the polymeric host material contains equal to or less then 5 ppm, but more than 0 ppm, such as at least 0.1 ppb, like at least 0.01 ppm, radical initiator based material relative to the total weight of the polymeric host material. Especially, when starting with such amounts of radical initiator (photo initiator), good results may be obtained in terms of polymerization (with relative high wavelength radiation) and stability of the nanoparticles (QDs) and/or light converter.

The term "radical initiator based material" refers to the remains of the radical initiator that can be found or evaluation from the composition of the polymeric host material. This radical initiator based material may include unreacted radical initiator, but also radical initiator that has been reacted. In case radical initiator has been consumed, it refers to groups in the polymeric host material that originate from the radical initiator. Assuming that the starting materials for the polymeric host material only comprises radical polymerizable monomers, and relative to the total amount of radical polymerizable monomers 1 ppm radical initiator is added, the amount of radical initiator based material in the polymeric host material will also be 1 ppm. The term "radical initiator" may in an embodiment refer to a plurality of different radical initiators.

The free radical polymerization process is well known and involves a reaction initiated by the formation of a free radical from a free radical generator, for example a peroxide or azo initiator. A reaction is initiated by addition of the free radical to an unsaturated monomer molecule that subsequently adds, in a step-wise manner, to additional unsaturated monomers to form a growing chain or polymer.

As can e.g. be derived from WO 03/093328, examples of free radical initiators include, but are not limited to, the following: organic peroxides like: t-alkyl peroxyesters, tert-butyl peroxybenzoate, tert-butyl peroxyacetate, ter-butyl peroxypivalate, tert-butyl peroxymaleate, monoperoxycarbonates, OO-tert-butyl O-isopropyl monoperoxycarbonate, diperoxyketals, ethyl 3, 3-di-(tert-amylperoxy)-butyrate, n-butyl-4,4-di (tertbutylperoxy)-valerate, 1,1-di (tert-butylperoxy)-cyclohexane, 1,1-di (tert-amylperoxy)-cyclohexane, dialkyl peroxides, 2,5-di (tert-butylperoxy)-2,5-dimethyl-3-hexyne, 2,5-di (tert-butylperoxy)-2,5-dimethylhexane, di-tert-amyl peroxide, di-tert-butyl peroxide, dicumyl peroxide, t-alkyl hydroperoxides, tert-butyl hydroperoxide, ter-amyl hydroperoxide, alpha-cumyl hydroperoxide, ketone peroxides, methyl ethyl ketone peroxide, cyclohexanone peroxide, 2,4-pentanedione peroxide, isobutyryl peroxide, isopropyl peroxydicarbonate, di-n-butyl peroxydicarbonate, di-sec-butyl peroxydicarbonate, tert-butyl perneodecanoate, dioctanoyl peroxide, didecanoyl peroxide, diproprionyl peroxide, didecanoyl peroxide, dipropionyl peroxide, dilauroyl peroxide, tert-butyl perisobutyrate, tert-butyl peracetate, tert-butyl per-,5,5-trimethyl hexanoate; azo compounds like: 2,2'-azobis [4-methoxy-2,4-dimethyl]pentanenitrile, 2,3'-azobis [2,4-dimethyl] pentanenitrile, 2,2'-azobis [isobutyronitrile]; carbon-carbon initiators like: 2,3-dimethyl-2,3-diphenylbutane, 3,4-dimethyl-3,4-diphenylhexane, 1,1,2,2-tetraphenyl-1,2-bis (trimethylsiloxy) ethane; inorganic peroxides like: hydrogen peroxide, potassium peroxydisulfate; photoinitiators like: benzophenone 4-phenylbenzophenone, xanthone thioxanthone, 2-chlorothioxanthone, 4,4'-bis (N,N'-dimethylamino benzophenone), benzyl, 9,10-phenanthraquinone, 9,10-anthraquinone, alpha,alpha-dimethyl-alpha-hydroxyacetophenone, (1-hydroxycyclohexyl)-phenylmethanone, benzoin ethers, like methyl, ethyl, isobutyl, benzoin ethers, alpha,alpha-dimethoxy-alpha-phenylacetophenone, 1-phenyl-1,2-propanedione, 2-(O-benzoyl)oxime, diphenyl(2,4,6-trimethylbenzoyl)phosphineoxide, alpha-dimethylamino-alpha-ethyl-alpha-benzyl-3,5-dimethyl-4-morpholinoacetophenone, etc.

As can for instance be derived from WO 2011/031871, there are in general two classes of photoinitiators. In the first class, the chemical undergoes unimolecular bond cleavage to yield free radicals. Examples of such photoinitiators include benzoin ethers, benzyl ketals, a-dialkoxy-acetophenones, a-amino-alkylphenones, and acylphosphine oxides. The second class of photoinitiators is characterized by a bimolecular reaction where the photo initiator reacts with a co-initiator to form free radicals. Examples of such are benzophenones/amines, thioxanthones/amines, and titanocenes (visible light). A non-exhaustive listing of specific examples of photoinitiators that may be useful with a photo-polymerizable monomer for particle preparation include the following from CIBA: IRGACURE 184 (1-hydroxy-cyclohexyl-phenyl-ketone), DAROCUR 1173 (2-hydroxy-2-methyl-1-phenyl-1-propanone), IRGACURE 2959 (2-hydroxy-1-[4-(2-hydroxyethoxy)phenyl]-2-methyl-1-propanone), DAROCUR MBF (Methylbenzoylformate), IRGACURE 754 (oxy-phenyl-acetic acid 2-[2 oxo-2 phenyl-acetoxy-ethoxy]-ethyl ester and oxy-phenyl-acetic 2-[2-hydroxy-ethoxy]-ethyl ester), IRGACURE 651 Alpha, (alpha-dimethoxy-alpha-phenylacetophenone), IRGACURE 369 (2-Benzyl-2-(dimethylamino)-1-[4-(4-morpholinyl)phenyl]-1-butanone), IRGACURE 907 (2-methyl-1-[4-(methylthio)phenyl]-2-(4-morpholinyl)-1-propanone), DAROCUR TPO (diphenyl(2,4,6-trimethylbenzoyl)phosphine oxide), IRGACURE 819 (phosphine oxide, phenyl bis (BAPO) (2,4,6-trimethyl benzoyl)), IRGACURE 784 (bis (eta 5-2,4-cyclopentadien-1-yl)Bis[2,6-difluoro-3-(1H-pyrrol-1-yl)phenyl]titanium), IRGACURE 250 (iodonium,(4-methylphenyl)[4-(2-methylpropyl)phenyl]-hexafluorophosphate(1-).) As indicated above, the total amount of radical initiator, of which examples are given above, relative to the polymeric host material is equal to or less then 5 ppm, like at maximum 1 ppm, such as at maximum even only 1 ppb.

The quantum dots or luminescent nanoparticles, which are herein indicated as light converter nanoparticles, may for instance comprise group II-VI compound semiconductor quantum dots selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe. In another embodiment, the luminescent nanoparticles may for instance be group III-V compound semiconductor quantum dots selected from the group consisting of GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. In yet a further embodiment, the luminescent nanoparticles may for instance be I-III-VI2 chalcopyrite-type semiconductor quantum dots selected from the group consisting of CuInS$_2$, CuInSe$_2$, CuGaS$_2$, CuGaSe$_2$, AgInS$_2$, AgInSe$_2$, AgGaS$_2$, and AgGaSe$_2$. In yet a further embodiment, the luminescent nanoparticles may for instance be I-V-VI2 semiconductor quantum dots, such as selected from the group consisting of LiAsSe$_2$, NaAsSe$_2$ and KAsSe$_2$. In yet a further embodiment, the luminescent nanoparticles may for instance be a group IV-VI compound semiconductor nano crystals such as SbTe. In a specific embodiment, the luminescent nanoparticles are selected from the group consisting of InP, CuInS$_2$, CuInSe$_2$, CdTe, CdSe, CdSeTe, AgInS$_2$ and AgInSe$_2$. In yet a further embodiment, the luminescent nanoparticles may for instance be one of the group II-VI, III-V, I-III-V and IV-VI compound semiconductor nano crystals selected from the materials described above with inside dopants such as ZnSe:Mn, ZnS:Mn. The dopant elements could be selected from Mn, Ag, Zn, Eu, S, P, Cu, Ce, Tb, Au, Pb, Tb, Sb, Sn and Tl. Herein, the luminescent nanoparticles based luminescent material may also comprise different types of QDs, such as CdSe and ZnSe:Mn.

It appears to be especially advantageous to use II-VI quantum dots. Hence, in an embodiment the semiconductor based luminescent quantum dots comprise II-VI quantum dots, especially selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe, even more especially selected from the group consisting of CdS, CdSe, CdSe/CdS and CdSe/CdS/ZnS.

The luminescent nanoparticles (without coating) may have dimensions in the range of about 2-50 nm, such as 2-20 nm, especially 2-10 nm, even more especially 2-5 nm; especially at least 90% of the nanoparticles have dimension in the indicated ranges, respectively, (i.e. e.g. at least 90% of the nanoparticles have dimensions in the range of 2-50 nm, or especially at least 90% of the nanoparticles have dimensions in the range of 2-5 nm). The term "dimensions" especially relate to one or more of length, width, and diameter, dependent upon the shape of the nanoparticle.

In an embodiment, the light converter nanoparticles have an average particle size in a range from about 1 to about 1000 nanometers (nm), and preferably in a range from about 1 to about 100 nm. In an embodiment, nanoparticles have an average particle size in a range from about 1 to about 20 nm. In an embodiment, nanoparticles have an average particle size in a range from about 1 to about 10 nm.

Typical dots are made of binary alloys such as cadmium selenide, cadmium sulfide, indium arsenide, and indium phosphide. However, dots may also be made from ternary alloys such as cadmium selenide sulfide. These quantum dots can contain as few as 100 to 100,000 atoms within the quantum dot volume, with a diameter of 10 to 50 atoms. This corresponds to about 2 to 10 nanometers. For instance, spherical particles such as CdSe, InP, or $CuInSe_2$, with a diameter of about 3 nm may be provided. The luminescent nanoparticles (without coating) may have the shape of spherical, cube, rods, wires, disk, multi-pods, etc., with the size in one dimension of less than 10 nm. For instance, nanorods of CdSe with the length of 20 nm and a diameter of 4 nm may be provided. Hence, in an embodiment the semiconductor based luminescent quantum dots comprise core-shell quantum dots. In yet another embodiment, the semiconductor based luminescent quantum dots comprise dots-in-rods nanoparticles. A combination of different types of particles may also be applied. Here, the term "different types" may relate to different geometries as well as to different types of semiconductor luminescent material. Hence, a combination of two or more of (the above indicated) quantum dots or luminescent nano-particles may also be applied.

One example, such as derived from WO 2011/031871, of a method of manufacturing a semiconductor nanocrystal is a colloidal growth process. Colloidal growth occurs by injection an M donor and an X donor into a hot coordinating solvent. One example of a preferred method for preparing monodisperse semiconductor nanocrystals comprises pyrolysis of organometallic reagents, such as dimethyl cadmium, injected into a hot, coordinating solvent. This permits discrete nucleation and results in the controlled growth of macroscopic quantities of semiconductor nanocrystals. The injection produces a nucleus that can be grown in a controlled manner to form a semiconductor nanocrystal. The reaction mixture can be gently heated to grow and anneal the semiconductor nanocrystal. Both the average size and the size distribution of the semiconductor nanocrystals in a sample are dependent on the growth temperature. The growth temperature necessary to maintain steady growth increases with increasing average crystal size. The semiconductor nanocrystal is a member of a population of semiconductor nanocrystals. As a result of the discrete nucleation and controlled growth, the population of semiconductor nanocrystals that can be obtained has a narrow, monodisperse distribution of diameters. The monodisperse distribution of diameters can also be referred to as a size. Preferably, a monodisperse population of particles includes a population of particles wherein at least about 60% of the particles in the population fall within a specified particle size range. A population of monodisperse particles preferably deviate less than 15% rms (root-mean-square) in diameter and more preferably less than 10% rms and most preferably less than 5%.

In an embodiment, nanoparticles can comprise semiconductor nanocrystals including a core comprising a first semiconductor material and a shell comprising a second semiconductor material, wherein the shell is disposed over at least a portion of a surface of the core. A semiconductor nanocrystal including a core and shell is also referred to as a "core/shell" semiconductor nanocrystal.

For example, the semiconductor nanocrystal can include a core having the formula MX, where M can be cadmium, zinc, magnesium, mercury, aluminum, gallium, indium, thallium, or mixtures thereof, and X can be oxygen, sulfur, selenium, tellurium, nitrogen, phosphorus, arsenic, antimony, or mixtures thereof. Examples of materials suitable for use as semiconductor nanocrystal cores include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing, including ternary and quaternary mixtures or alloys.

The shell can be a semiconductor material having a composition that is the same as or different from the composition of the core. The shell comprises an overcoat of a semiconductor material on a surface of the core semiconductor nanocrystal can include a Group IV element, a Group II-VI compound, a Group II-V compound, a Group III-VI compound, a Group III-V compound, a Group IV-VI compound, a Group I-III-VI compound, a Group II-IV-VI compound, a Group II-IV-V compound, alloys including any of the foregoing, and/or mixtures including any of the foregoing, including ternary and quaternary mixtures or alloys. Examples include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing. For example, ZnS, ZnSe or CdS overcoatings can be grown on CdSe or CdTe semiconductor nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating may comprise one or more layers. The overcoating comprises at least one semiconductor material which is the same as or different from the composition of the core. Preferably, the overcoating has a thickness from about one to about ten monolayers. An overcoating can also have a thickness greater than ten monolayers. In an embodiment, more than one overcoating can be included on a core.

In an embodiment, the surrounding "shell" material can have a band gap greater than the band gap of the core material. In certain other embodiments, the surrounding shell material can have a band gap less than the band gap of the core material.

In an embodiment, the shell can be chosen so as to have an atomic spacing close to that of the "core" substrate. In certain other embodiments, the shell and core materials can have the same crystal structure.

Examples of semiconductor nanocrystal (core)shell materials include, without limitation: red (e.g., (CdSe)ZnS (core) shell), green (e.g., (CdZnSe)CdZnS (core)shell, etc.), and blue (e.g., (CdS)CdZnS (core)shell (see further also above for examples of specific light converter nanoparticles, based on semiconductors.

Especially, the light converter comprises 0.001-25 wt. % light converter nanoparticles relative to the total weight of the light converter, such as 0.1-20 wt. %, especially not more than 5 wt. %.

In an embodiment, semiconductor nanocrystals preferably have ligands attached thereto, such as e.g. described in WO 2011/031871. In an embodiment, the ligands can be derived from the coordinating solvent used during the growth process. In an embodiment, the surface can be modified by repeated exposure to an excess of a competing coordinating group to form an overlayer.

For example, a dispersion of the capped semiconductor nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the semiconductor nanocrystal, including, for example, phosphines, thiols, amines and phosphates. The semiconductor nanocrystal can be exposed to short chain polymers which exhibit an affinity for the surface and which terminate in a moiety having an affinity for a liquid medium in which the semiconductor nanocrystal is suspended or dispersed. Such affinity improves the stability of the suspension and discourages flocculation of the semiconductor nanocrystal.

More specifically, the coordinating ligand can have the formula:

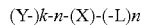

$(Y-)k-n-(X)-(-L)n$ wherein k is 2, 3 4, or 5, and n is 1, 2, 3, 4 or 5 such that k-n is not less than zero; X is O, OS, O—Se, O—N, O—P, O—As, S, S=0, S02, Se, Se=0, N, N=0, P, P=0, C=0 As, or As=0; each of Y and L, independently, is H, OH, aryl, heteroaryl, or a straight or branched C2-18 hydrocarbon chain optionally containing at least one double bond, at least one triple bond, or at least one double bond and one triple bond. The hydrocarbon chain can be optionally substituted with one or more C1-4 alkyl, C2-4 alkenyl, C2-4 alkynyl, C1-4 alkoxy, hydroxyl, halo, amino, nitro, cyano, C3-5 cycloalkyl, 3-5 membered heterocycloalkyl, aryl, heteroaryl, C1-4 alkylcarbonyloxy, C1-4 alkyloxycarbonyl, C1-4 alkylcarbonyl, or formyl. The hydrocarbon chain can also be optionally interrupted by —O—, —S—, —N(Ra)—, —N(Ra)—C(O)—O—, —O—C(O)—N(Ra)—, —N(Ra)—C(O)—N(Rb)—, —O—C(O)O—, —P(Ra)—, or —P(O)(Ra)—. Each of Ra and Rb, independently, is hydrogen, alkyl, alkenyl, alkynyl, alkoxy, hydroxylalkyl, hydroxyl, or haloalkyl. An aryl group is a substituted or unsubstituted cyclic aromatic group. Examples include phenyl, benzyl, naphthyl, tolyl, anthracyl, nitrophenyl, or halophenyl. A heteroaryl group is an aryl group with one or more heteroatoms in the ring, for instance furyl, pyridyl, pyrrolyl, phenanthryl.

A suitable coordinating ligand can be purchased commercially or prepared by ordinary synthetic organic techniques, for example, as described in J. March, Advanced Organic Chemistry. Other ligands are described in U.S. patent application Ser. No. 10/641,292 for "Stabilized Semiconductor Nanocrystals", filed 15 Aug. 2003, which issued on 9 Jan. 2007 as U.S. Pat. No. 7,160,613, which is hereby incorporated by reference in its entirety. Other examples of ligands include benzylphosphonic acid, benzylphosphonic acid including at least one substituent group on the ring of the benzyl group, a conjugate base of such acids, and mixtures including one or more of the foregoing. In an embodiment, a ligand comprises 4-hydroxybenzylphosphonic acid, a conjugate base of the acid, or a mixture of the foregoing. In an embodiment, a ligand comprises 3,5-di-tert-butyl-4-hydroxybenzylphosphonic acid, a conjugate base of the acid, or a mixture of the foregoing. Additional examples of ligands that may be useful with the present invention are described in International Application No. PCT/US2008/ 010651, filed 12 Sep. 2008, of Breen, et al., for "Functionalized Nanoparticles And Method" and International Application No. PCT/US2009/004345, filed 28 Jul. 2009 of Breen et al., for "Nanoparticle Including Multi-Functional Ligand And Method", each of the foregoing being hereby incorporated herein by reference.

In an embodiment, the light converter can optionally further be provided with a cover, coating or layer for protection from the environment (e.g., dust, moisture, and the like) and/or scratching or abrasion.

Especially, the light converter is enclosed by an encapsulate or encapsulation. As used herein, "encapsulation" may refer to protection against a particular element or compound, for example, oxygen ($O_2$)(such as in the form of air) and/or water. In an embodiment, encapsulation can be complete (also referred to herein as full encapsulation).

In an embodiment, encapsulation can be less than complete (also referred to herein as partial encapsulation). Hence, in an embodiment, the optical material is at least partially encapsulated. Therefore, in an embodiment the optical material is at least partially encapsulated by a barrier material. Especially, in an embodiment the optical material is at least partially encapsulated by a material that is substantially impervious to oxygen. In an embodiment, the optical material is at least partially encapsulated by a material that is substantially impervious to moisture (e.g. water). In an embodiment, the optical material is at least partially encapsulated by a material that is substantially impervious to air. In an embodiment, the optical material is at least partially encapsulated by a material that is substantially impervious to oxygen and moisture.

In an embodiment, for example, the optical material can be sandwiched between substrates. In an embodiment, one or both of the substrates can comprise glass plates. In an embodiment, for example, the optical material can be sandwiched between a substrate (e.g., a glass plate) and a barrier film. In an embodiment, the optical material can be sandwiched between two barrier films or coatings.

In an embodiment, the optical material is fully encapsulated. In an embodiment, for example, the optical material can be sandwiched between substrates (e.g., glass plates) that are encapsulated by a perimeter encapsulation. In an embodiment, for example, the optical material can be disposed on a substrate (e.g., a glass support) and fully covered by barrier film. In an embodiment, for example, the optical material can be disposed on a substrate (e.g., a glass support) and fully covered by protective coating. In an embodiment, the optical material can be sandwiched between two barrier films or coatings that are encapsulated by a perimeter encapsulation. Examples of suitable barrier films or coatings include, without limitation, a hard metal oxide coating, a thin glass layer, and Barix coating materials available from Vitex Systems, Inc. Other barrier films or coatings can be readily ascertained by a person skilled in the art.

In an embodiment, more than one barrier film or coating can be used to encapsulate the optical material. Hence, also a multi-layer may be applied to form the barrier film or coating, or a multi-layer of barrier films or coatings may be applied to provide the encapsulation Especially, the light converter is enclosed by an encapsulation, especially an oxygen non-permeable encapsulation. Hence, the encapsulation is especially configured to block transport of oxygen from the atmosphere into the encapsulated light converter. The encapsulation may comprise different parts. For instance, the encapsulation may comprise two transmissive plates, between which the light converter is sandwiched, and a coating, film, or glue for final enclosing the edges of the light converter. The light converter can also be prepared in a container comprising a light transmissive material, which after preparation is closed with a (transmissive) cover, which may be glued, or welded to the container (edges). Hence, any solid material in which the light converter can be contained and which especially can block oxygen transport can be considered an encapsulation. In a specific embodiment, the encapsulation comprises a container containing the light converter, and a cover, wherein the container and cover are attached to each other and enclose the light converter. At least part of the encapsulation is transmissive for light, especially in the visible, and will thereby allow excitation light reach the light converter nano particles and allow emission light therefrom (at least in the visible) escape from the encapsulated light converter.

As will be clear to a person skilled in the art, part of the encapsulation is transmissive for light, especially transmissive for light of the light source and for light generated by the light converter when being irradiated with the light source light (see also above). Especially, the encapsulation should preferably have an oxygen permeability of at most 10E-04 mL/m2/24 hours, at 10° C. and 85% relative humidity, especially at most 10E-05 mL/m2/24 hours, at 10° C. and 85% relative humidity. Water permeability should preferably be at most 10E-05 g/m2/24 hours at 10° C., especially at most 10E-06 g/m2/24 hours at 10° C. Hence, the light converter unit may especially include a $O_2$ and $H_2O$ non-permeable encapsulation, which encapsulation especially encloses a substantial part of the light converter, even more especially the entire light converter. Hence, the encapsulation may enclose the light converter over its entire perimeter.

In yet a further aspect, the invention provides a method for the production of a light converter, the light converter comprising a polymeric host material with light converter nanoparticles embedded in the polymeric host material, the method comprising:
  providing a mixture ("starting mixture" or "starting materials") comprising radical polymerizable monomers, light converter nanoparticles, and optionally radical initiator;
  polymerizing the radical polymerizable monomers under low oxygen conditions, preferably under an inert atmosphere, thereby providing the polymeric host material with light converter nanoparticles embedded in the polymeric host material;
  wherein equal to or less then 5 ppm radical initiator relative to the total weight of the polymeric host material is applied.

In this way, the light converter as further defined above may be obtained. Especially, the method further includes enclosing the thus obtained light converter by an encapsulation (see also above).

Also other species (in addition to the monomers and the light converter nanoparticles) may be present in the starting mixture and may be incorporated in the polymeric host material. For instance, reflective particles like $TiO_2$ particles may also be incorporated. Also inorganic luminescent material, not having nanoparticle character, like micron sized particulate inorganic luminescent materials may be present, as well as the above indicated cross-linker. Information about the monomers and the light converter nanoparticles, as well as about the optional radical initiator, are indicated above. As can also be derived from the above, the mixture may comprise 0.001-25 wt. % light converter nanoparticles relative to the total weight of the mixture.

Especially, the radical polymerizable monomers are selected from the group consisting of a vinyl monomer, an acrylate monomer, and a combination of a thiol and a diene.

The amount of radical initiator—if any—is here related to the weight of the polymeric host material. When a radical initiator is applied, especially a photo initiator is applied. Especially, the starting mixture contains equal to or less then 5 ppm, but more than 0 ppm, such as at least 0.1 ppb, like at least 0.01 ppm, radical initiator relative to the total weight of the polymeric host material (that is produced with the method). Especially, when starting with such amounts of radical initiator (photo initiator), good results may be obtained in terms of polymerization (with relative high wavelength radiation) and stability of the nanoparticles (QDs) and/or light converter.

The polymerization may be started by heating and or irradiating the radical polymerizable polymers, especially may be started by (at least) irradiating the radical polymerizable monomers. Especially, polymerization may be initiated photo chemically upon irradiation with high energetic rays such as UV, X-rays, gamma rays, electrons. If in the substantial absence of radical (photo)initiator the polymerization may be started by (e.g. UV) irradiation of the mixture (including the radical polymerizable monomers). In some cases it may be desirable to heat up the mixture above the glass transition of the system in order to reach complete polymerization. When polymerization starts, the temperature may again be lowered below the glass transition temperature; after termination, the thus obtained light converter may in some embodiments be cooled down below the glass transition temperature. However, also other methods may be applied, as will be clear to the person skilled in the art. Especially, during polymerization the temperature will not be higher than the boiling point of the monomer(s) used.

Even with radiation having a wavelength in the range of 250-470 nm, such as 300-460 nm, such as even at least 300 nm, like even above 350 nm, such as 365 nm, polymerization of the system (in the substantial absence of a radical initiator) may be photo initiated. An advantage of these large wavelength photo initiation, such as at wavelengths larger than 300 nm, especially larger than 350 nm, may be that the penetration depth of the light can be larger, which may lead to better and/or more homogeneous polymerization (for even thicker polymeric layers).

Preferably, before polymerization starts (substantially), the partial pressure of oxygen over the mixture is substantially reduced. For instance, the mixture may be provided in a low-oxygen atmosphere, or after providing the mixture but before polymerization, the oxygen partial pressure is lowered. In an embodiment, the polymerization takes place in a low-oxygen environment, like a glove box. Especially, an inert gas may be applied, like one or more of Ar, $CO_2$ or $N_2$. Optionally, polymerization may take place under reduced pressure. Alternatively, the oxygen amount in the gas over the mixture, at least during polymerization, is less than 1 ppm, such as less than 0.2 ppm. Hence, the method may especially comprise polymerizing the radical polymerizable monomers while maintaining the mixture in an inert gas atmosphere.

Further, the method may comprise enclosing the thus obtained light converter by an encapsulation, especially an oxygen non-permeable encapsulation. Especially, this encapsulation is applied while the light converter is still under the reduced oxygen atmosphere. Examples of encapsulation are given above.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

Figure 3:
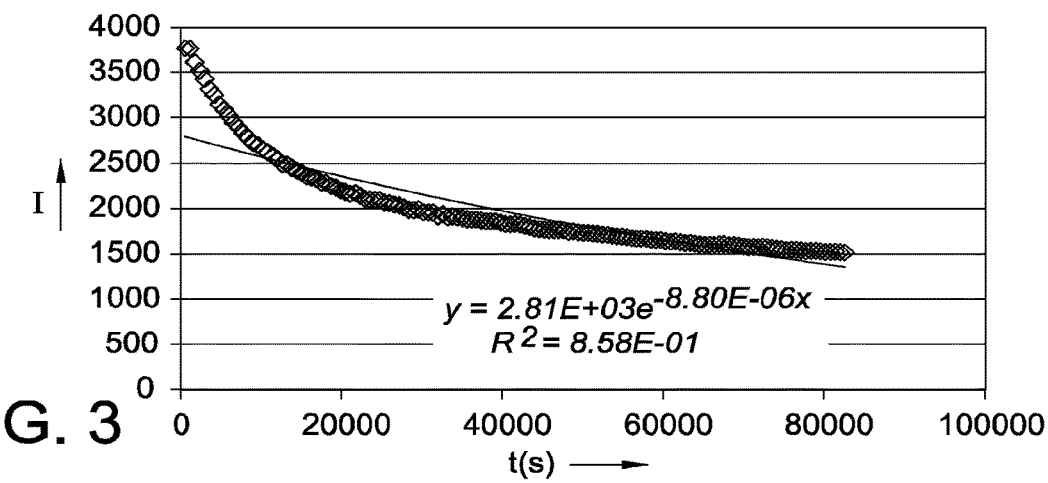
Figure 4:
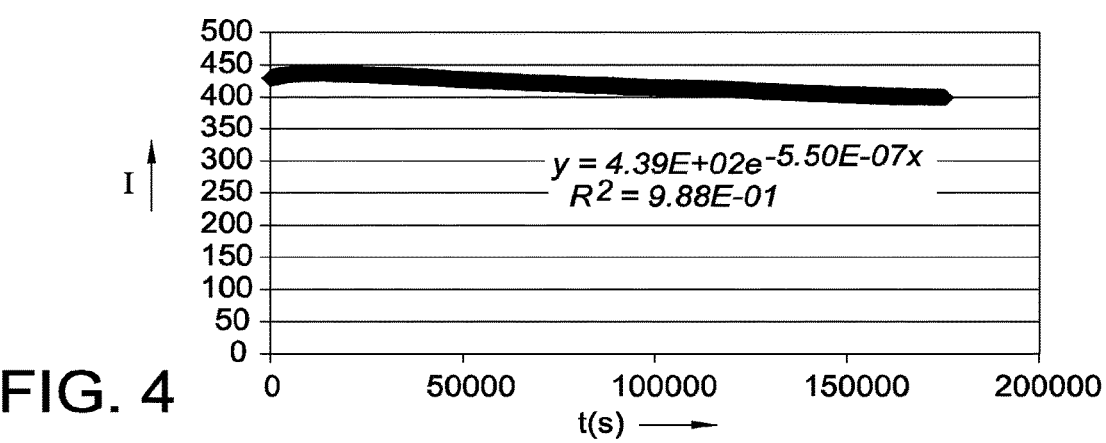
Figure 5:
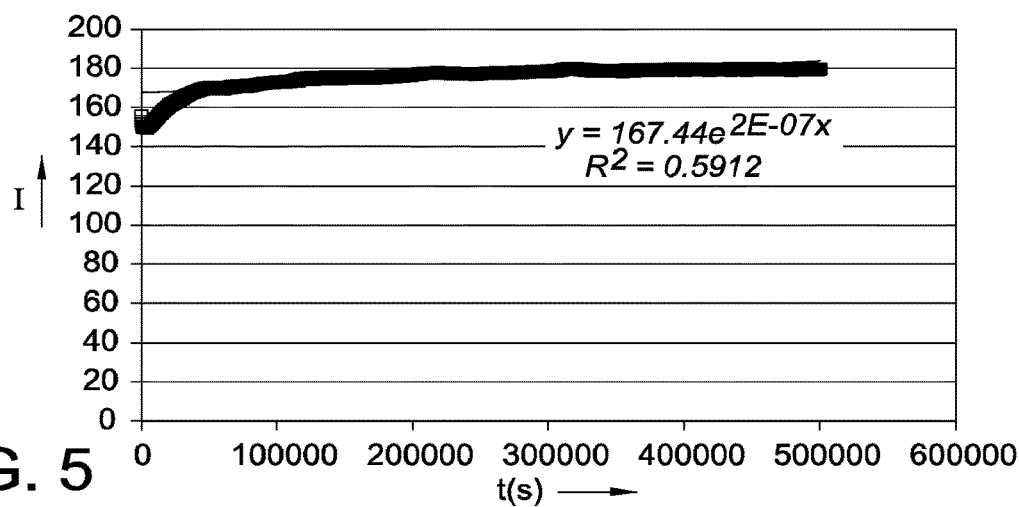

FIGS. 3-5 show some experimental results.

DETAILED DESCRIPTION OF THE EMBODIMENTS

Figure 1A:
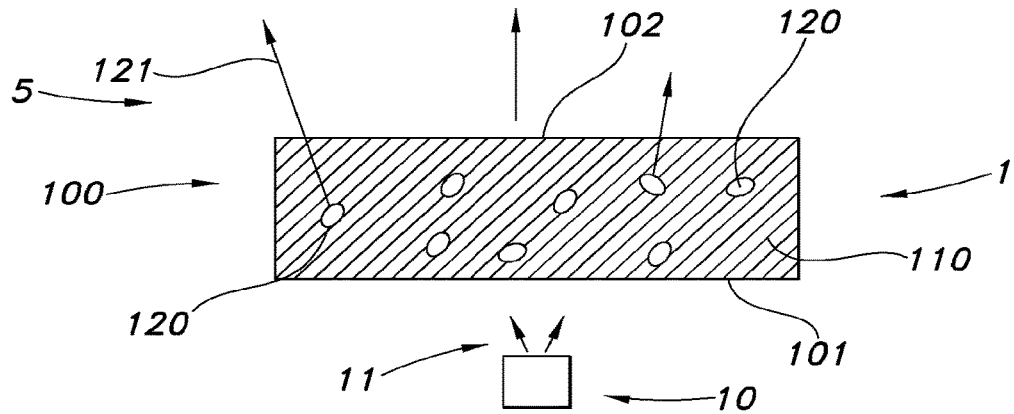
FIGS. 1a-1c schematically depict some aspects of the device(s) of the invention.

FIG. 1a schematically depicts a lighting device 1 comprising a light source 10 configured to generate light source light 11 and a light converter 100 configured to convert at least part of the light source light 11 into visible converter light 121. Here schematically only one light source 10 is depicted. However, more than one light source 10 may be present.

The light converter has an upstream side 101, which is at least partly directed to the light source 10, and a downstream side, which faces away from the light source 10 (in this transmissive configuration).

The light converter 100 comprises a polymeric host material 110 with light converter nanoparticles 120 embedded in the polymeric host material 110. These can be dots, rods, a combination thereof, etc. (see also above). The light converter nanoparticles 120 generate upon excitation by the light source light 11 visible converter light (and optionally also non-visible radiation, like IR radiation). At least part form the converter light 121 escapes from the downstream side 102 as lighting device light 5. This lighting device light 5, of which at least part is in the visible, at least contains part of the convert light 121, and may optionally also contain some remaining light source light 11.

FIG. 1a schematically depicts the lighting device in operation.

Figure 1B:
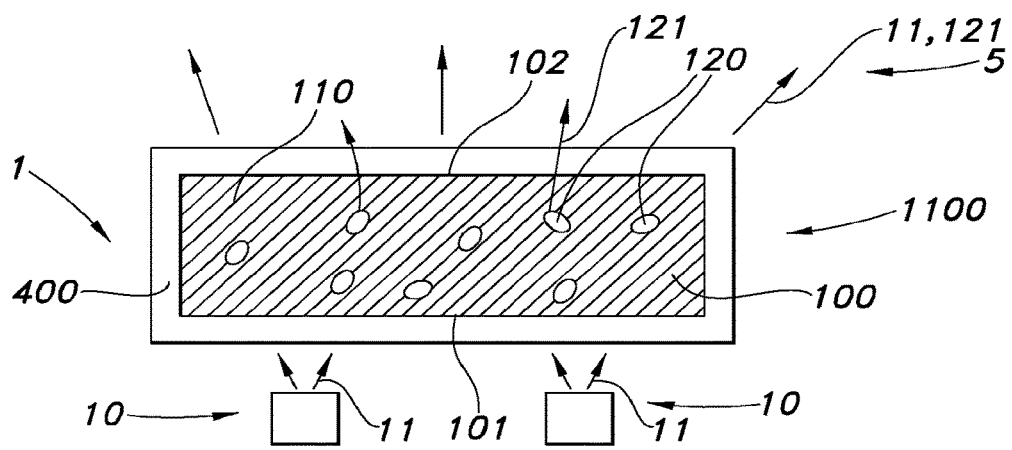

FIG. 1b schematically depicts another embodiment, wherein the light converter 100 is encapsulated. An encapsulation 400 encloses the light converter; this encapsulation may substantially block oxygen (and/or $H_2O$) transporter from the atmosphere to the light converter. This may add to the stability of the light converter nanoparticles 120 (and the polymeric host). The combination of light converter 100 and encapsulation 400 is herein also indicated as light converter unit 1100.

Figure 1C:
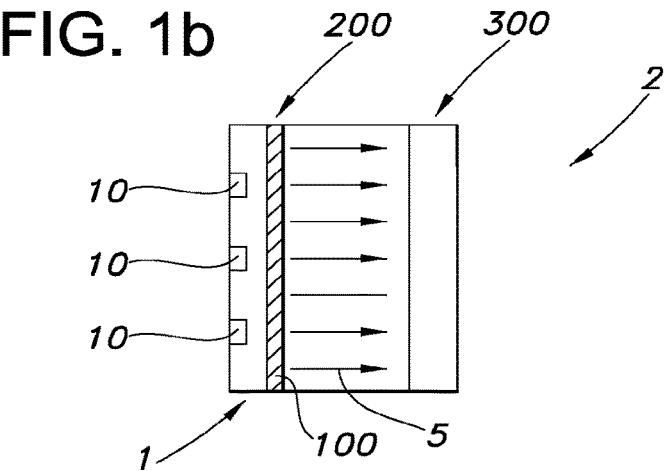

FIG. 1c schematically depicts one of the applications of the lighting unit 1, here in a liquid crystal display device 2, which comprises a back lighting unit 200 which comprises one or more lighting units 1 (here, one lighting unit is schematically depicted), as well as a LCD panel 300, which can be backlighted with the lighting device light 5 of the lighting unit(s) 100 of the back lighting unit 200.

Figure 2:
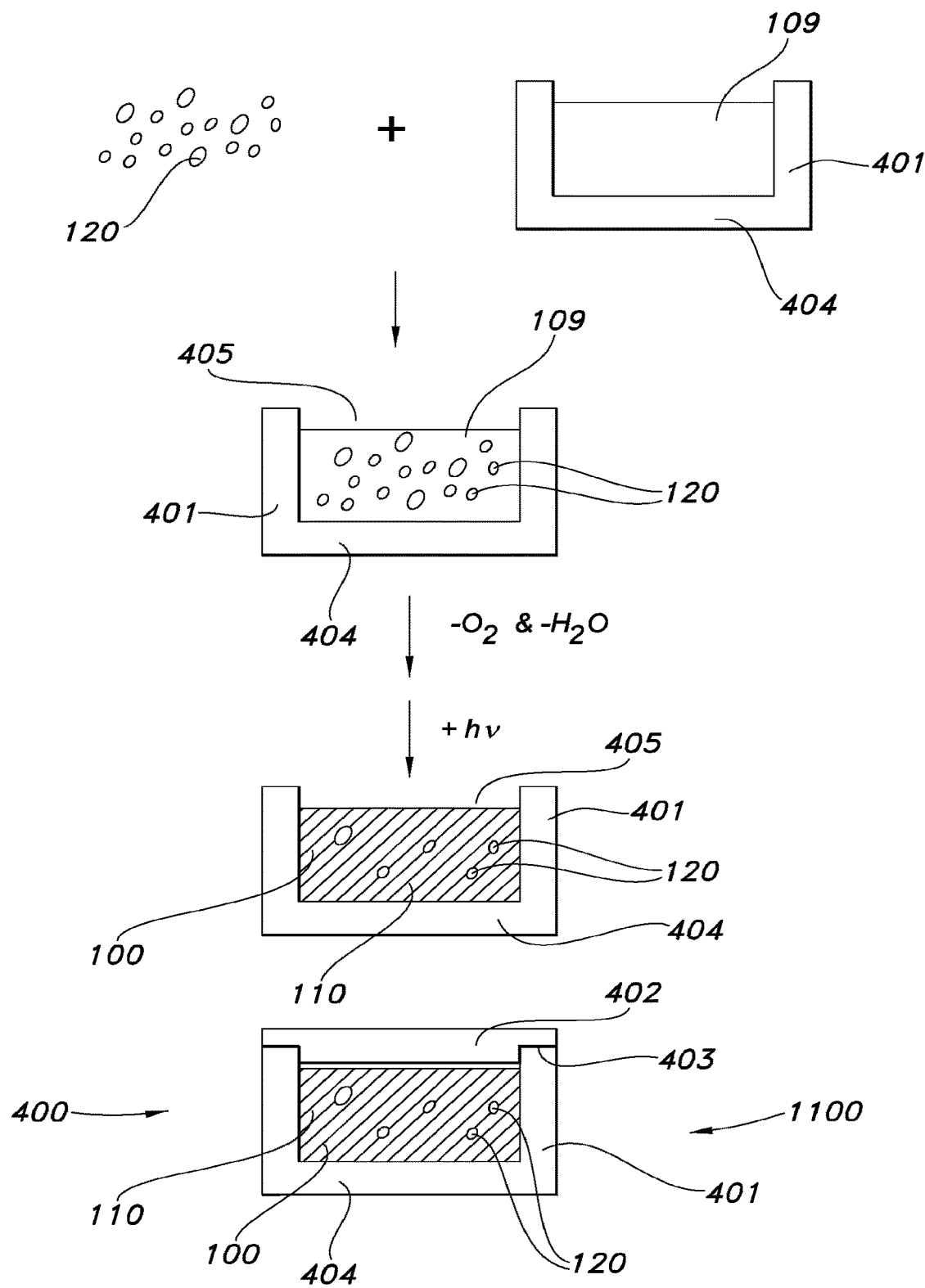
FIG. 2 schematically depicts an embodiment of the method of the invention.

FIG. 2 schematically depicts an embodiment of the method of the invention, which may comprise providing a mixture comprising radical polymerizable monomers 109 and light converter nanoparticles 120 (and optionally radical initiator; not depicted). The mixture may be provided in a container 401, having walls 404. Part of these walls may be transmissive for light source light and/or converter light (see also FIG. 1b).

Preferably, after providing, or even already during this mixture, the oxygen amount in the atmosphere over the mixture is kept low, for instance by reducing the partial pressure. This may be done by evacuation and/or introduction of an inert gas. This is indicated with the symbol "—$O_2$". Further, also especially water vapor may be removed (at the same time and/or in the same way; this is indicated with the symbol "—$H_2O$").

Thereafter, polymerization may take place, i.e. polymerizing the radical polymerizable monomers 109 under low oxygen conditions, preferably under an inert atmosphere, thereby providing the polymeric host material 110 with light converter nanoparticles 120 embedded in the polymeric host material 110. Especially, polymerization is started by irradiating the radical polymerizable monomers (indicated by the symbol "+hv").

After polymerization, the thus obtained light converter 100 may be entirely encapsulated, such as with a closure 402 configured to close a container opening 405. Optionally, such closure may be welded or glued or otherwise be connected to the container walls 404 in a sealing connection. In this way, the light converter unit 1100 is obtained (see also FIG. 1b), which comprises the thus obtained light converter 100 enclosed by an encapsulation, especially an oxygen non-permeable encapsulation 402,404. One or more parts of this encapsulation 402,404 may be transmissive for light source light and/or converter light (see also FIG. 1b).

Hence, the invention provides a polymer composite obtained by free radical polymerization comprising luminescent light converter nanoparticles containing low concentration of photo initiator. Especially, the concentration of the initiator is less than 1 ppm and more preferentially less than 1 ppb. In fact, a photo curable monomer may be applied without photo initiator. Especially, polymerization takes place under low oxygen conditions, preferably under an inert atmosphere, and with low or zero radical initiator content.

In an embodiment, the polymer is a poly vinyl, polyacrylate or a thiolene system. In an embodiment, the composite comprises a cross-linked network; the cross links are chemical cross links. Especially, the composite may be sealed from atmosphere. This encapsulation may be a hermetic encapsulation. In an embodiment, the encapsulation is thin film packaging.

The quantum dots may have the quantum yield of 60% or above at room temperature. The concentration of light converter nanoparticles is preferentially less than 20%. Optionally, the quantum dots comprise ligands which can copolymerize with the polymer.

The invention further provides a method of producing the composite involving making a monomeric mixture comprising light converter nanoparticles removing oxygen from the system and then placing the mixture in a confinement and initiating polymerization photo chemically upon irradiation with high energetic rays such as UV, X-rays, gamma rays, electrons.

Optionally, the composite may be used in combination with one or more light converting phosphors for producing white light for illumination. The composite can be used in lighting device for backlighting for LCD.

The light converter nanoparticle emission may especially be at least in the red part of the visible spectrum (especially peak position between 610-620 nm).

EXPERIMENTAL

A plurality of systems was made, under different conditions. Here below, one example is given.

A mixture containing 5 wt. % QDs (CdSe with ZnS shell) and acrylate monomer were produced (with various amounts of photo radical initiator). The mixture was then placed in an environment with low $O_2$ and $H_2O$ concentration<5 ppm to remove oxygen.

Subsequently the mixture was placed between glass plates and exposed to UV radiation (>=1 w/cm$^2$) 365 nm for initiation of polymerization to obtain a solid polymer containing luminescent QDs. Samples were produced in the presence and absence of photo initiator.

The samples were then tested by irradiating them with laser light emitting at 450 nm (0.4 W/cm$^2$) at 100° C. and measuring the intensity of the luminescence from quantum dots in Nitrogen atmosphere. The results are shown in FIGS. 3-5, with on the y-axis relative intensity in arbitrary units).

The sample with 1 wt. % initiator (FIG. 3) had a substantial lower stability than the sample with 0.1 wt. % photo initiator (FIG. 4); which was also not very stable. The sample without photo initiator was very stable (FIG. 5).

Photoluminescence stability measurements were performed for at least 500 hours (continuous irradiation with the 450 nm light).

The invention claimed is:

1. A device comprising:
a light source for generating light source light,
a light converter for converting at least part of the light source light into visible converter light, the light converter comprising:
a polymeric host material;
light converter nanoparticles embedded in the polymeric host material; wherein:
the polymeric host material is based on radical polymerizable monomers, and
the polymeric host material contains equal to or less than 5 ppm radical initiator based material relative to the total weight of the polymeric host material; and
first and second substrates, wherein the first and second substrates sandwich the polymeric host material and the light converter nanoparticles.

2. The device of claim 1 wherein the first and second substrates are glass plates.

3. The device of claim 1 wherein the first and second substrates are barrier films.

4. The device of claim 1 wherein the first substrate is a glass plate and the second substrate is a barrier film.

5. The device of claim 1 wherein the first substrate is a hard metal oxide coating.

6. The device of claim 1 wherein the first and second substrates are encapsulated by a perimeter encapsulation.

7. The device of claim 1 wherein the first substrate is a multi-layer film.

8. The device of claim 1 wherein the first and second substrates are oxygen non-permeable.

9. The device of claim 1 further comprising glue disposed on edges of the light converter.

10. The device of claim 1 wherein the first substrate comprises a container in which the polymeric host material and the light converter nanoparticles are disposed, and the second substrate comprises a cover glued or welded to edges of the container.

11. A device comprising:
a light source for generating light source light,
a light converter for converting at least part of the light source light into visible converter light, the light converter comprising:
a polymeric host material; and
light converter nanoparticles embedded in the polymeric host material; wherein:
the polymeric host material is based on radical polymerizable monomers,
the polymeric host material contains equal to or less than 5 ppm radical initiator based material relative to the total weight of the polymeric host material, and
a portion of the light converter is reflective.

12. The device of claim 11 wherein the portion of the light converter that is reflective forms a wall of a light mixing chamber.

13. The device of claim 12 wherein the light mixing chamber comprises an exit window, wherein the exit window is a portion of the light converter that is transmissive.

14. The device of claim 11 wherein the light source light is blue and the visible converter light is one of yellow, green, and red.

15. The device of claim 11 wherein substantially all of the light source light is converted by the light converter, such that light exiting the device is substantially all visible converter light.

16. A device comprising:
a light source for generating light source light,
a light converter for converting at least part of the light source light into visible converter light, the light converter comprising:
a polymeric host material; and
light converter nanoparticles embedded in the polymeric host material; wherein:
the polymeric host material is based on radical polymerizable monomers, and
the polymeric host material contains equal to or less than 5 ppm radical initiator based material relative to the total weight of the polymeric host material; and
particles not having nanoparticle character disposed in a path of one of the light source light and the visible converter light.

17. The device of claim 16 wherein the particles not having nanoparticle character are micron sized particulate inorganic luminescent material.

18. The device of claim 16 wherein the particles not having nanoparticle character are reflective $TiO_2$ particles.

19. The device of claim 16 wherein the light converter is enclosed by an encapsulation, wherein the encapsulation is configured to reduce exposure of the light converter to $O_2$.

20. The device of claim 16 wherein the polymeric host material is selected from the group consisting of a poly vinyl polymer, a poly acrylate polymer and a thiol-ene polymer.

* * * * *